O. E. FELLS.
VERTICALLY ADJUSTABLE HINGE.
APPLICATION FILED AUG. 25, 1914.

1,154,850.

Patented Sept. 28, 1915.

Witnesses
M. S. Watson
Harry M. Teat

Inventor
O. E. Fells

UNITED STATES PATENT OFFICE.

ORLEY E. FELLS, OF SPOKANE, WASHINGTON.

VERTICALLY-ADJUSTABLE HINGE.

1,154,850.  Specification of Letters Patent.  Patented Sept. 28, 1915.

Application filed August 25, 1914. Serial No. 858,511.

*To all whom it may concern:*

Be it known that I, ORLEY E. FELLS, a citizen of the United States, residing at Spokane, in the county of Spokane, State of Washington, have invented certain new and useful Improvements in Vertically-Adjustable Hinges; and I do hereby declare the following to be a full, clear, and exact description of the invention, such as will enable others skilled in the art to which it appertains to make and use the same.

This invention relates to improvements in vertically adjustable hinges for gates.

The principal object of the invention is to provide a simple and novel gate hanger by means of which the gate can be quickly and easily raised to permit it to be swung open or closed over snow or ice.

Another object is to provide such an adjustable hanger which will not interfere with the ordinary swinging of the gate when so adjusted.

Other objects and advantages will be apparent from the following description, when taken in connection with the accompanying drawings.

Figure 1:
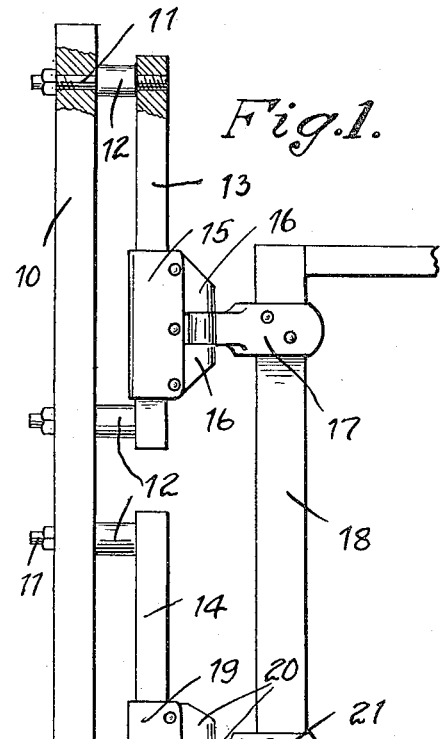
Figure 3:
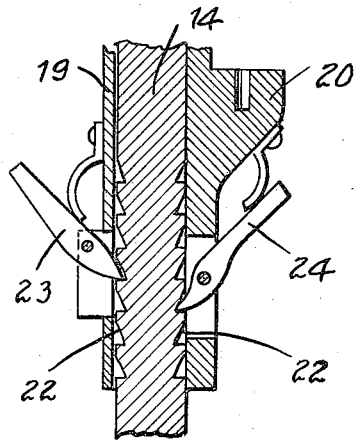
Figure 2:
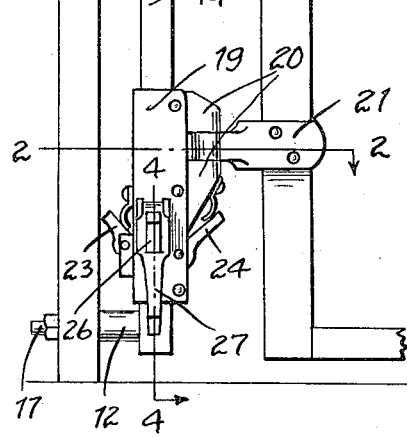
Figure 4:
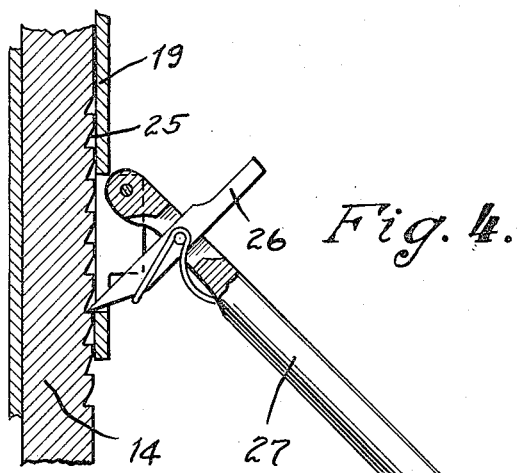

In the drawings: Figure 1 is an elevation of the gate hanger and fragment of a gate carried thereby. Fig. 2 is a horizontal sectional view on the line 2—2 of Fig. 1. Fig. 3 is a section on the line 3—3 of Fig. 2. Fig. 4 is a vertical section on the line 4—4 of Fig. 1.

Referring particularly to the accompanying drawings, 10 represents the post of the gate. Secured to the post by the bolt 11 and spaced away from the post by means of the collars 12 are the vertical bars 13 and 14, said bars being arranged in a vertical line. Slidable vertically on the bar 13 is a member 15 provided with a pair of vertically alining perforated ears 16 between which is mounted a member 17 attached to one end of the gate 18. This forms one hinge of the gate. Slidable vertically on the lower bar 14 is a member 19, this member being also provided with the ears 20 to which is pivotally connected the gate carried member 21 of the lower hinge. The lower portion of the bar 14 has formed on the face adjacent the post 10 and on the opposite face thereto, the ratchet teeth 22 which are arranged to be engaged by the spring pressed pawls 23 and 24 pivotally mounted on the member 19.

On one of the side faces of the bar 14 are formed the ratchet teeth 25 for engagement by a pivoted pawl 26 carried by a hand lever 27 pivotally mounted on the member 19. By means of this lever 27 and its pawl 26 the member 19 can be moved vertically on the bar 14, and at each advance step in the elevation of said member the pawls 23 and 24 engage the other ratchet faces of the bar and hold the member in adjusted position. As the member 19 moves upwardly motion is transmitted to the member 15 by the connection with the gate through the members 21 and 17 so that the member 15 also moves upwardly. Thus the gate and its hinges can be moved to any height within the limits of the lengths of the bars 13 and 14. This permits the gate to be readily swung open or closed when the presence of ice or snow beneath the gate would otherwise interfere with the movements of the gate. This adjustable means is also useful in hanging the gate so as to adjust the gate to the proper height to clear the ground. The device is further useful in raising the gate when the gate sags and touches the ground.

What is claimed is:

1. A gate adjusting means comprising vertical members carried by the gate post, one of the members being provided with teeth on its faces, members slidably mounted on the vertical members, each pivotally connected with one end of the gate, means carried by the lower of the slidable members for lifting the members, and means carried by said lower member for holding the member in different adjusted positions.

2. The combination with a gate post, of vertical bars secured to and spaced from the post, members vertically slidable on the bars and hinged to the gate, one of the slidable members carrying pivoted spring pressed pawls, ratchet teeth carried by the bar for engagement of the pawls, and a pivoted lever mounted on said slidable member and carrying a pivoted pawl for engagement of certain of the ratchet teeth for moving the said slidable member vertically on the bar.

In testimony whereof, I affix my signature, in the presence of two witnesses.

ORLEY E. FELLS.

Witnesses:
 G. W. YOUNG,
 NETA HOWELL.

Copies of this patent may be obtained for five cents each, by addressing the "Commissioner of Patents, Washington, D. C."